Sept. 29, 1964   J. COMTE   3,151,187
FLUID FILTERING SYSTEM
Filed April 25, 1960

INVENTOR
JEAN COMTE

United States Patent Office 3,151,187
Patented Sept. 29, 1964

3,151,187
FLUID FILTERING SYSTEM
Jean Comte, Longeville-les-Metz, Moselle, France, assignor to Société Alsacienne de Constructions Mecaniques Lorsid, Moselle, France, a company of France
Filed Apr. 25, 1960, Ser. No. 24,354
Claims priority, application France Apr. 23, 1959
1 Claim. (Cl. 261—3)

This invention relates to apparatus for filtering, purifying and/or scrubbing fluids, both liquid and gaseous.

In conventional apparatus of this type a stream of the fluid is passed through a permeable body of filtering material. This may be formed by one or more screens of fabric, wire mesh or the like, or it may be a bed of divided materials such as sand, gravel, diatomaceous earth, or solid elements such as balls or other metal fragments. The particles or matter to be removed from the fluid by the filtering process, such as dirt or some desired constituent, are deposited on the surfaces of the filtering bed or screen and after a time such deposit builds up to such an amount that further filtering action is impeded. It then becomes necessary to clean the body of filtering material or replace it with a fresh one, and this usually necessitates cutting off the flow of fluid at predetermined intervals; this is an objectionable handicap in many industrial processes that would otherwise be of a fully continuous character. To overcome this difficult, in many installations there are provided two filtering or scrubbing units in parallel and the flow of fluid is switched alternately from one to the other. This involves undesirable duplication of equipment. Moreover, between two successive filter-cleaning or replacing steps the filtering or scrubbing action does not proceed uniformly because of the gradual build-up of filtered solids on the surfaces of the filter screen or bed.

According to the invention, broadly, the fluid is passed through a conduit; within the conduit are provided means defining a pair of spaced perforate walls extending across the conduit; a mass of divided filtering material is fed continuously into an inlet provided at one end of the space between said walls, through said space and discharged from an outlet at the other end of said space. Desirably the mass of filtering material is continuously cleaned or regenerated as it issues from said outlet and is continuously returned to the inlet to provide a closed circulation loop.

The above and further objects, aspects and features of the invention will become apparent as the disclosure proceeds with reference to the accompanying drawings in which exemplary embodiments of the invention are shown for purposes of illustration but not of limitation, and wherein.

Figure 1:
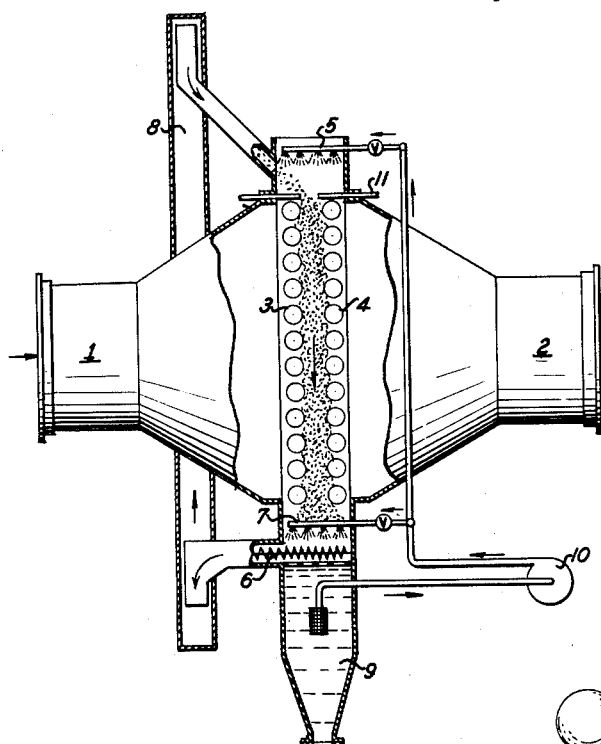
FIG. 1 is a view partly in section of a gas scrubbing installation according to the invention.

The apparatus shown in FIG. 1 is particularly applicable to a gas scrubbing installation. It comprises a casing having a body in the form of two opposed cone frustums with end connector sections 1 and 2 adapted for insertion of the unit in a gas conduit. Across the center of the casing extend the spaced perforate vertical walls 3 and 4 which may assume the other form described. The casing has a top feed chamber communicating with the upper end of the space between said walls by way of a feed-control gate 11. The casing has a bottom discharge chamber in which is mounted a horizontal conveyor screw or auger 6 which picks up the filtering material as it issues from the casing and discharges it to the bottom end of an elevator device of any suitable form diagrammatically indicated at 8. From the top of the elevator the material flows by gravity into the top feeder chamber. A treating fluid circuit is provided and comprises a pump 10 which takes up fluid from a sump 9 provided below the discharge auger and delivers it simultaneously to two sprayer pipes, including the upper sprayer pipe 5 positioned in the inlet chamber and the lower sprayer 7 provided in the discharge chamber and serving more particularly to wash the filtering material clean of the solids accumulated thereon during its flow through the filter casing, before said material is recycled by way of the elevator. The solids collected in the liquid that has thus served to wash the filtering materials are allowed to settle out in the sump 9 and may be discharged through a bottom outlet of said pump. If desired, any suitable means may be provided for treating the liquid prior to recycling it back to the sprayers or liquid spray pipes 5 and 7.

Figure 2:
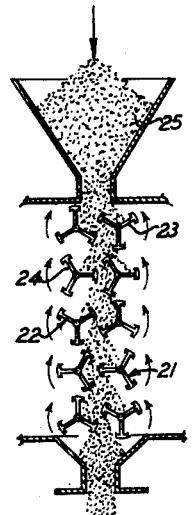
FIG. 2 is a simplified cross sectional view of a modified form of the invention.

In the modified system shown in FIG. 2, the two spaced perforate walls 21 and 22 extending across the conduit are provided by two sets of parallel, spaced, multivaned rotatable elements 23 and 24 respectively, journalled on suitable pivot means extending across the vertical side walls of the conduit. Rotatable feeding and discharge means may here by provided although they have not been shown for simplicity. The two sets of rotatable multivaned elements comprise a means of controlling the rate of descent of the divided filtering material. Such a system has been disclosed in my co-pending application Ser. No. 24,379, filed April 25, 1960, and now Patent No. 3,118,574, issued January 21, 1964, to which reference may be had for a more detailed description thereof. The elements are mounted so that their vane tips preferably describe slightly overlapping paths, and are so spaced in each array that the segment of material defined between two adjacent pairs of elements is partly or wholly supported upon the vanes of the lower two elements of the pairs. The elements are rotated in opposite directions as indicated by the arcuate arrows and they may either be positively driven in such rotation from suitable power means or they may be retarded in such rotation by suitable braking means to retard the descent of the material under gravity, depending on requirements.

Figure 3C:
FIGS. 3a through 3h illustrate in perspective some typical shapes of filtering elements useable according to the invention.
Figure 3D:
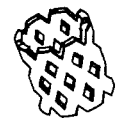
Figure 3A:
Figure 3B:
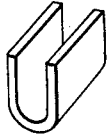
Figure 3F:
Figure 3E:
Figure 3H:
Figure 3G:

The divided filtering material used in accordance with the invention may assume any of various forms. Any of the materials heretofore used for comparable purposes, including sand, gravel and the like may be employed. Advantageously however the filtering material comprises metal elements such as balls, rings (e.g., Raschig or Pall rings), or other shapes. Thus FIG. 3a shows one suitable shape of filtering element as comprising a pipe segment cut in half lengthwise. FIG. 3b shows a longitudinally bent metal plate formed into a horseshoe cross sectional shape. FIG. 3c shows a steel ball. FIG. 3d shows a section of perforate tubing. FIG. 3e shows a saddle-shaped element (such as that known as a Berl saddle). FIG. 3f shows a helical spring. FIG. 3g shows a pipe section having a longitudinal cut in a side thereof and distorted to have overlapping edges. And FIG. 3h shows a filtering element in the form of a tube section formed with a diametric web in it. The shapes shown are, of course, merely illustrative. The nature of the filtering material to be used should in each case be determined in the light of the specific requirements of the process, but as a general rule the material should be inert to the fluid and strong enough mechanically to avoid the formation of particles and dust. Filtering elements made of ceramics, glass and plastics may also be used.

It will thus be apparent that a novel filtering or scrubbing system has been provided which has a unique advantage over conventional systems in that the renewal of the filtering bed or screen is effected continuously rather than intermittently as was heretofore the case. This not only insures smoother and more economical continuous processing, but also greatly improves the effectiveness and uniformity of the filtering action since the filtering bed is at all times equally charged with separated solids, in contrast with what is true in all prior-art systems, in which the amount of solids deposited on the filter bed steadily increased from one filter-changing or -cleaning step to the next.

Various modifications may of course be made in the exemplary constructions here described and shown. Temperature control means may be incorporated in the system e.g. by delivering heating or cooling fluid through the elements, e.g., multi-vaned rotatable elements, constituting one or both of the perforate walls between which the filter bed is contained. The perforate walls may be constructed otherwise than shown or than expressly described. Rotatable multi-vaned barrel members for the intake and discharge of the filter material into and out of the system may be replaced by other suitable means which will permit the requisite input and output of solid filtering material while providing a fluid-tight seal preventing egress of the fluid out of the conduit. Thus, rotatable auger conveyer means may be used in which the auger is enclosed within an angularly displaceable cylindrical casing having an elongated outlet formed therein so as to regulate the amount of material fed and distribute it uniformly over a desired area of predetermined length, while insuring the requisite fluid-tight seal.

While the arrangement shown wherein the spaced vert-perforate walls are vertical so as to provide a vertical space through which the filtering material may be fed by gravity, and wherein the fluid flows horizontally normally to the bed of filtering material, is usually preferred, it will be understood that other arrangements may well be used, in which the filter bed may be other than vertical, e.g. horizontal, in which case motive force other than gravity would have to be relied upon in order to feed the filtering material across the fluid flow path.

What is claimed is:

A fluid filtering system comprising flow path defining means adapted for the passage of a stream of fluid, a plurality of substantially vertically spaced pairs of substantially horizontally spaced rotatable multivaned members defining a pair of spaced perforate walls extending across said flow path, said members extending longitudinally and transversely across said flow path, the members of each pair of said members being parallel to one another and being disposed at substantially the same level, said members including vane tips which upon rotation of said members describe overlapping paths whereby said multivaned members are effective for controlling over the whole length of the space between said perforate walls the rate of flow and the fluid permeability of a mass of divided filtering material, an inlet and an outlet respectively at the upper and lower ends of the space between said walls, means for feeding said mass of divided filtering material into said inlet and through said space, receiving and returning means for receiving said filtering material at a location below said outlet and for returning said filtering material to said filtering material feeding means via a return path external of said flow path defining means, a first liquid spray pipe located above said inlet and adapted to discharge a liquid onto said filtering material fed into said inlet, means for feeding said liquid to said first spray pipe, a second liquid spray pipe located between said outlet and said receiving and returning means and adapted to discharge liquid onto said filtering material issued from said outlet, means for feeding a liquid to said second spray pipe, settling tank means for receiving liquid discharged onto said material, pumping means and conduit means connecting the inlet side of said pumping means to said settling tank means and said first and second spray pipes to the outlet side of said pumping means whereby liquid is circulated in a closed circuit between said settling tank means and first and second spray pipes.

References Cited in the file of this patent

UNITED STATES PATENTS

| | | |
|---|---|---|
| 2,637,540 | Rowe | May 5, 1953 |
| 2,686,192 | Bonotto | Aug. 10, 1954 |
| 2,828,761 | Weibert | Apr. 1, 1958 |

FOREIGN PATENTS

| | | |
|---|---|---|
| 216,675 | Great Britain | June 5, 1924 |
| 442,514 | Germany | Apr. 2, 1927 |
| 41,268 | France | Aug. 30, 1932 |
| | (1st addition to No. 704,568) | |